United States Patent [19]

Tung

[11] Patent Number: 4,605,728
[45] Date of Patent: Aug. 12, 1986

[54] HIGH STRENGTH COPOLYESTER

[75] Inventor: William C. T. Tung, Tallmadge, Ohio

[73] Assignee: The Goodyear Tire & Rubber Company, Akron, Ohio

[21] Appl. No.: 774,215

[22] Filed: Sep. 9, 1985

[51] Int. Cl.$^4$ .............................................. C08G 69/44
[52] U.S. Cl. .................................. 528/289; 528/291; 528/300
[58] Field of Search ................... 528/289, 291, 300

[56] References Cited

U.S. PATENT DOCUMENTS

| 3,274,159 | 9/1966 | Kluiber ................................ 528/289 |
| 3,461,136 | 8/1969 | Pruckmayr et al. ............. 528/289 X |
| 4,245,086 | 1/1981 | Uno et al. ......................... 528/289 X |

Primary Examiner—Lucille M. Phynes
Attorney, Agent, or Firm—Alvin T. Rockhill

[57] ABSTRACT

It has been determined that the mechanical and thermal properties of polyesters can be improved by incorporating bis-hydroxyalkyl pyromellitic diimides therein. Such polyesters are comprised of repeat units which are derived from (a) at least one diacid component and (b) a diol component which is comprised of (1) from 2 to 90 mole percent of at least one bis-hydroxyalkyl pyromellitic diimide and (2) from 10 to 98 mole percent of one or more members selected from the group consisting of glycols containing from 2 to 12 carbon atoms and glycol ethers containing from 4 to 12 carbon atoms.

19 Claims, No Drawings

HIGH STRENGTH COPOLYESTER

SUMMARY OF THE INVENTION

Polyesters are utilized in many applications wherein it is important for them to have high strength and good thermal properties. For instance, polyesters are commonly utilized in making tire cords and molded articles wherein high tensile strength is required. Such tire cords are commonly made out of polyethylene terephthalate which has respectable tensile strength. However, it would be highly desirable to modify the polyethylene terephthalate in a manner that would increase its tensile strength.

It has been discovered that bis-hydroxyalkyl pyromellitic diimides can be utilized to modify polyesters in order to improve their strength and to increase their glass transition temperature ($T_g$). This modification is accomplished by copolymerizing the bis-hydroxyalkyl pyromellitic diimide into the polyester as a monomeric repeat unit. In other words, the bis-hydroxyalkyl pyromellitic diimide is polymerized into the polyester as an additional diol component.

The present invention more specifically relates to a polyester comprised of repeat units which are derived from (a) at least one diacid component and (b) a diol component which is comprised of (1) from 2 to 90 mole percent of at least one bis-hydroxyalkyl pyromellitic diimide and (2) from 10 to 98 mole percent of one or more members selected from the group consisting of glycols containing from 2 to 12 carbon atoms, glycol ethers containing from 4 to 12 carbon atoms, and polyether glycols having the structural formula:

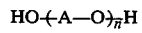

wherein A is an alkylene group containing from 2 to 6 carbon atoms and wherein n is an integer from 2 to 400.

The present invention also reveals a process for preparing a high strength copolyester which comprises copolymerizing (a) at least one diacid component and (b) a diol component which is comprised of (1) from 2 to 90 mole percent of at least one bis-hydroxyalkyl pyromellitic diimide and (2) from 10 to 98 mole percent of one or more members selected from the group consisting of glycols containing from 2 to 12 carbon atoms, glycol ethers containing from 4 to 12 carbon atoms, and polyether glycols having the structural formula:

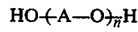

wherein A is an alkylene group containing from 2 to 6 carbon atoms and wherein n is an integer from 2 to 400.

DETAILED DESCRIPTION OF THE INVENTION

The polyester compositions of this invention are prepared by reacting a diacid component with a diol component. The diacid component can, of course, be a diester, such as dimethyl terephthalate. The term "diacid component" as used herein is therefore intended to include diesters. The term "diol component" as used herein is also deemed to include glycol ethers (diethers) and polyether glycols. These polyester compositions can be made in any conventional manner well known in the art. Thus, conventional temperatures, catalysts, amounts of catalysts, stabilizers, and the like, are utilized in manners well known in the literature and art.

The diacid component in the polyesters to which this invention pertains are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component utilized in the preparation of the polyesters of this invention is comprised of from 2 to 90 mole percent of at least one bis-hydroxyalkyl pyromellitic diimide. Such bis-hydroxyalkyl pyromellitic diimides generally have the structural formula:

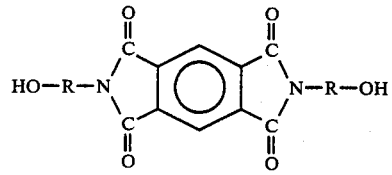

wherein R represents an alkylene group containing from 1 to 20 carbon atoms. The hydroxyalkyl groups in the bis-hydroxyalkyl pyromellitic diimides normally utilized in the practice of the present invention will normally contain from 1 to 8 carbon atoms (the alkylene group in the structural formula shown above contains from 1 to 8 carbon atoms). In most cases, the diimides utilized will contain hydroxyalkyl groups that contain from 2 to 4 carbon atoms. Bis-hydroxyethyl pyromellitic diimide is a good example of a bis-hydroxyalkyl pyromellitic diimide that can be utilized in modifying polyesters in accordance with the present invention.

The diol component utilized in preparing the copolyesters of the present invention will normally contain from 5 to 50 mole percent of one or more bis-hydroxyalkyl pyromellitic diimides. Preferably the diol component will be comprised of from 10 to 25 mole percent of at least one bis-hydroxyalkyl pyromellitic diimide. The remaining portion of the diol component will be comprised of additional copolymerizable diols. Normally, these copolymerizable diols will be selected from the group consisting of glycols containing from 2 to 12 carbon atoms, glycol ethers containing from 4 to 12 carbon atoms, and polyether glycols having the structural formula:

$$HO\text{−}(A\text{−}O)_n H$$

wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. Some representative examples of polyether glycols that can be used include polytetramethylene glycol (Polymeg TM) and polyethylene glycol (Carbowax TM).

The modified polyesters prepared in accordance with the present invention can also be branched. Such branching is normally attained by utilizing a branching agent in the polyesterification reaction utilized in the synthesis of the polyester. Such branching agents normally contain three or more functional groups and preferably contain three or four functional groups. The reactive groups may be carboxyl or aliphatic hydroxyl. The branching agent can contain both types of groups. Examples of acidic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

Bis-hydroxyethyl pyromellitic diimide was prepared by adding 7.4 moles of ethanol amine and 300 ml. of ethylene glycol to a 12-liter round-bottom flask equipped with a stirrer. The temperature of the contents of the flask raised as 3.7 moles of pyromellitic dianhydride powder was slowly added to the mixture indicating that an exothermic reaction was taking place. Heating was adjusted so as to maintain the reaction mixture at a temperature of 150° C. for three hours.

Water which was produced as a by-product of the reaction was distilled out of the bis-hydroxyethyl pyromellitic diimide produced. Upon cooling, the entire mass solidified into waxy solid bis-hydroxyethyl pyromellitic diimide. It was washed three times with methanol, filtered, and dried. The reaction that took place is illustrated by the equation:

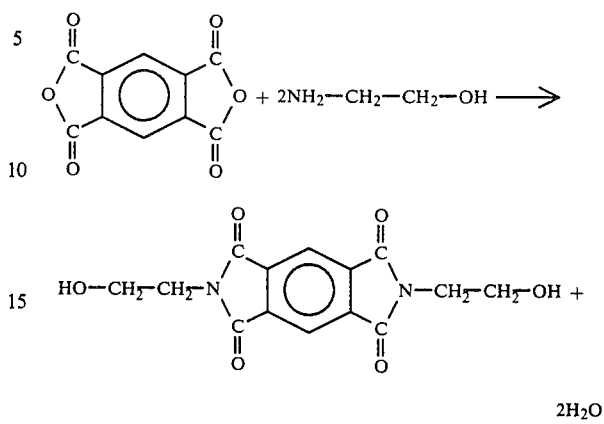

EXAMPLE 2

An oligomer of terephthalic acid and ethylene glycol containing from about 2 to about 10 repeat units (with a 0.2 mole percent excess of ethylene glycol) was charged into a reactor with 7.76 mole percent of bis-hydroxyethyl pyromellitic diimide (based upon the total diol component). Thus, the diol component was comprised of 92.24 mole percent ethylene glycol and 7.76 mole percent bis-hydroxyethyl pyromellitic diimide. The mixture was polymerized at a temperature of 280°–300° C. under reduced pressure (less than 0.5 ml. of mercury) for two hours utilizing antimony trioxide ($Sb_2O_3$) as a catalyst. The polymer produced was discharged from the reactor and was determined to have a glass transition temperature of 84° C.

EXAMPLE 3

The procedure utilized in Example 2 was repeated in this experiment except that more bis-hydroxyethyl pyromellitic diimide was charged into the reactor. More specifically, in this experiment, 12.56 mole percent bis-hydroxyethyl pyromellitic diimide was utilized in the diol component. It was determined that the polymer produced utilizing this procedure had a glass transition temperature of 96° C.

A control experiment was also conducted wherein no bis-hydroxyethyl pyromellitic diimide was utilized as a monomer in the polymerization. In other words, unmodified polyethylene terephthalate was made in the control experiment. The polyethylene terephthalate made in the control experiment was determined to have a glass transition temperature of 67° C. This clearly shows that bis-hydroxyalkyl pyromellitic diimides can be incorporated into polyesters in order to increase their glass transition temperature. In fact, the modified polyester made in Example 2 had a glass transition temperature that was 17° higher than the unmodified polyethylene terephthalate and the modified copolyester prepared in Example 3 had a glass transition temperature that was 29° higher than the unmodified polyester.

EXAMPLE 4

A modified copolyester was prepared utilizing the procedure described in Example 2 except that 12.24 mole percent of bis-hydroxyethyl pyromellitic diimide and 87.76 mole percent of ethylene glycol were utilized as the diol component. The copolyester produced had an intrinsic viscosity of 0.78. The resin produced was dried and injection molded into test samples for evaluating physical properties. For purposes of comparison, unmodified PET having an intrinsic viscosity of 0.8 was also molded into test samples. It was determined that the modified copolyester had a flex strength of 17,785 psi with the unmodified polyethylene terephthalate having a flex strength of only 15,530 psi. The tensile strength at break and the tensile modulus for the modified samples were determined to be 11,247 psi and 4,633 psi, respectively. It was determined that the unmodified polyethylene terephthalate samples had a tensile strength at break and a tensile modulus of only 8,091 psi and 3,620 psi, respectively. This example clearly shows that the polyesters made in accordance with this invention have considerably higher strength than do standard polyesters. In fact, this example shows that the tensile modulus of polyesters which are modified in accordance with this invention can be increased by more than 25 percent.

While certain representative embodiments have been shown for the purpose of illustrating the present invention, it will be apparent to those skilled in this art that various changes and modifications can be made therein without departing from the scope of the present invention.

What is claimed is:

1. A polyester comprised of repeat units which are derived from (a) at least one diacid component and (b) a diol component which is comprised of (1) from 2 to 90 mole percent of at least one bis-hydroxyalkyl pyromellitic diimide and (2) from 10 to 98 mole percent of one or more members selected from the group consisting of glycols containing from 2 to 12 carbon atoms, glycol ethers containing from 4 to 12 carbon atoms, and polyether glycols having the structural formula:

$$HO(A-O)_nH$$

wherein A is an alkylene group containing from 2 to 6 carbon atoms and wherein n is an integer from 2 to 400.

2. A polyester as specified in claim 1 wherein said diacid component is selected from the group consisting of alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, and diesters of alkyl substituted aryl dicarboxylic acids which contain from 11 to 22 carbon atoms.

3. A polyester as specified in claim 2 wherein said diol component is comprised of (1) from 5 to 50 mole percent of at least one bis-hydroxyalkyl pyromellitic diimide and (2) from 50 to 95 mole percent of one or more members selected from the group consisting of glycols, glycol ethers, and polyether glycols.

4. A polyester as specified in claim 3 wherein the hydroxyalkyl group in said bis-hydroxyalkyl pyromellitic diimide contains from 1 to 8 carbon atoms.

5. A polyester as specified in claim 4 wherein said diacid components are selected from the group consisting of alkyl dicarboxylic acids which contain from 4 to 12 carbon atoms, diesters of alkyl dicarboxylic acids which contain from 6 to 12 carbon atoms, aryl dicarboxylic acids which contain from 8 to 16 carbon atoms, and diesters of aryl dicarboxylic acids which contain from 10 to 15 carbon atoms.

6. A polyester as specified in claim 5 wherein said glycols contain from 2 to 8 carbon atoms and wherein said glycol ethers contain from 4 to 8 carbon atoms.

7. A polyester as specified in claim 6 wherein said diacid component is selected from the group consisting of aryl dicarboxylic acids containing from 8 to 16 carbon atoms and diesters of aryl dicarboxylic acids containing from 10 to 18 carbon atoms.

8. A polyester as specified in claim 7 wherein the hydroxyalkyl group in said bis-hydroxyalkyl pyromellitic diimide contains from 2 to 4 carbon atoms.

9. A polyester as specified in claim 8 wherein said diol component contains from 10 to 25 mole percent of said bis-hydroxyalkyl pyromellitic diimide.

10. A polyester as specified in claim 9 wherein said diacid component is terephthalic acid or a diester thereof.

11. A polyester as specified in claim 10 wherein said bis-hydroxyalkyl pyromellitic diimide is bis-hydroxyethyl pyromellitic diimide.

12. A polyester as specified in claim 11 wherein said member selected from the group consisting of glycols, glycol ethers, and polyether glycols is ethylene glycol.

13. A process for preparing a high strength copolyester which comprises copolymerizing (a) at least one diacid component and (b) a diol component which is comprised of (1) from 2 to 90 mole percent of at least one bis-hydroxyalkyl pyromellitic diimide and (2) from 10 to 98 mole percent of one or more members selected from the group consisting of glycols containing from 2 to 12 carbon atoms, glycol ethers containing from 4 to 12 carbon atoms, and polyether glycols having the structural formula:

$$HO(A-O)_nH$$

wherein A is an alkylene group containing from 2 to 6 carbon atoms and wherein n is an integer from 2 to 400.

14. A polyester as specified in claim 1 which is in the form of a tire cord.

15. A polyester as specified in claim 12 which is in the form of a tire cord.

16. A process as specified in claim 13 wherein the hydroxyalkyl group in said bis-hydroxyalkyl pyromellitic diimide contains from 1 to 8 carbon atoms and wherein said diacid component is selected from the group consisting of aryl dicarboxylic acids containing from 8 to 16 carbon atoms and diesters of aryl dicarboxylic acids containing from 10 to 18 carbon atoms.

17. A process as specified in claim 16 wherein said members selected from the group consisting of glycols, glycol ethers, and polyether glycols are selected from the group consisting of glycols containing from 2 to 8 carbon atoms and glycol ethers containing from 4 to 8 carbon atoms.

18. A process as specified in claim 17 wherein said bis-hydroxyalkyl pyromellitic diimide is bis-hydroxyethyl pyromellitic diimide; wherein said diacid component is terephthalic acid or a diester of terephthalic acid; and wherein said member selected from the group consisting of glycols, glycol ethers, and polyether glycols is ethylene glycol.

19. A process as specified in claim 13 wherein said diol component contains from 10 to 25 mole percent bis-hydroxyalkyl pyromellitic diimide.

* * * * *